Nov. 18, 1930.  P. M. BOURDON  1,782,285
WHEEL FOR RAILROAD VEHICLES
Filed Sept. 15, 1930

Inventor:
Pierre M. Bourdon
by Henry Orth
Attorney.

Patented Nov. 18, 1930

1,782,285

UNITED STATES PATENT OFFICE

PIERRE MARCEL BOURDON, OF PARIS, FRANCE, ASSIGNOR TO MICHELIN & CIE., OF CLERMONT-FERRAND, FRANCE, A CORPORATION OF FRANCE

WHEEL FOR RAILROAD VEHICLES

Application filed September 15, 1930, Serial No. 482,032, and in France October 28, 1929.

The present invention relates to the flanges of railroad vehicle wheels. It has for its primary object to prevent the flanges of these wheels from transmitting to the wheels and consequently to the vehicle itself, the noise and vibrations caused by the friction of the flange against the rail-head, particularly in curves.

My invention is particularly applicable to railroad vehicle wheels provided with pneumatic tyres, which wheels are thus rendered perfectly sound-proof. However it is to be understood that the invention may be used with advantage with all railroad vehicle wheels and in particular with steel railroad vehicle wheels.

I have shown by way of example several applications of my invention in accompanying drawings.

My improved flange comprises three superposed parts:

The first part A forms part of an element secured to the wheel or to the wheel tyre; the second part B is an insulating or vibration-damping part and the third C is adapted to bear against the rail-head 5.

Figure 1:
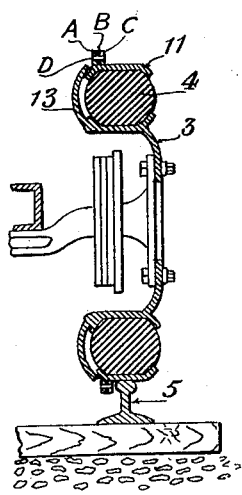
Fig. 1 is a sectional view of the flange according to my invention applied to a wheel provided with a pneumatic tyre of the type wherein the flange forms part of the peripheric protecting plate.

In Fig. 1, part A is constituted by a part secured to or integral with the plate 11 serving as an outer cover for the rubber or similar tyre carried by the wheel 3.

Figure 2:
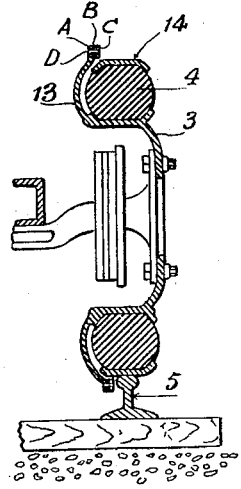
Fig. 2 is a similar view showing the flange used with a wheel carrying a pneumatic tyre, said flange forming part of an independent side plate secured to the wheel.

In Fig. 2 the part A is secured to or is integral with the side plate 13 carried by the support of the yielding part 4 of the rim which is provided with a cover 14 independent of the flange.

Figure 4:
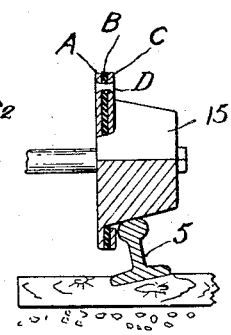
Fig. 4 shows a flange according to my invention used with a wheel having no pneumatic tyre.

In Fig. 4 the arrangement is similar to that of Fig. 2 except that the part A is disposed like the usual wheel flanges i. e. it is cast in one with or secured to the metal part 15 of the wheel.

As the annular plate C is adapted to rub against the rail-head 5, it is alone liable to wear and consequently requires alone to be replaced. It may be made of a very resistant metal unless it is desired to reduce the wear of the rail head at the expense of the lining C. As this lining is easy to replace without changing the whole flange this last manner of making it may prove more economical.

The three superposed plates A B C are held together through any suitable means such as bolts, rivets, screws etc. Obviously, the heads D of such parts are countersunk in part C so as not to project against the railhead 5.

Figure 3:
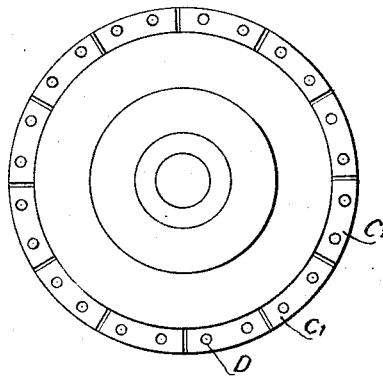
Fig. 3 is a plan view of a particular form of execution of the flange.

In order to obtain a less noisy device, I may use the arrangement shown in front view in Fig. 3. In this device the outer lining C, instead of forming a continuous ring is constituted by a series of independent segments $C_1$, $C_2$, $C_3$. This arrangement reduces still more the noise by preventing the vibrations arising at the point of contact between the flange and the rail-head from being transmitted to the whole part C of the flange and thereby to the whole of the wheel.

What I claim is:

1. A flange for railroad vehicle wheels comprising a part secured to the wheel rim, a part adapted to rub against the rail-head and an elastic vibration-damping part interposed between the two first parts.

2. A flange for railroad vehicles comprising a flat ring secured to the outside of the wheel rim, a coaxial flat ring adapted to rub against the rail-head and an elastic flat vibration-damping ring interposed between the two first rings.

3. A railroad vehicle wheel comprising a wheel body, a tyre carried thereby, and a flange fitted over the tyre constituted by the superposition of three annular parts of which one outer part forms the rolling surface adapted to be in contact with the rail head, the other outer part forming a support and the middle part being insulating and sound-damping.

4. A flange for railroad vehicles comprising a flat supporting ring, a yielding sound-damping ring carried thereby, a plurality of segmental parts carried on the outside of last mentioned ring for contact with the railhead and countersunk elongated means securing the segmental parts to the superposed rings.

In testimony that I claim the foregoing as my invention, I have signed my name.

PIERRE MARCEL BOURDON.